UNITED STATES PATENT OFFICE.

JOHN DALLAS GREGORY, OF LOUISVILLE, KENTUCKY.

BAKING-POWDER.

SPECIFICATION forming part of Letters Patent No. 544,975, dated August 20, 1895.

Application filed April 11, 1895. Serial No. 545,365. (No specimens.)

*To all whom it may concern:*

Be it known that I, JOHN DALLAS GREGORY, a citizen of the United States, residing at Louisville, in the county of Jefferson and State of Kentucky, have invented certain new and useful Improvements in Composition of Matter; and I do declare the following to be a full, clear, and exact description of the invention, such as will enable others skilled in the art to which it appertains to make and use the same.

My invention relates to a composition of matter designed for use for culinary purposes, more particularly as a baking-powder, but also adapted for use for making a palatable effervescing beverage efficacious in cases of fever, affording both a cooling and nutritious beverage.

The object of the invention is to provide for incorporating with a mixture containing bicarbonate of soda and cream of tartar the nutritious properties of milk in a dry or desiccated state free from the acid found in milk in a stage of fermentation and free from extraneous substances ordinarily added to milk in processes heretofore practiced for desiccating the milk, my purpose being to employ and preserve in a sweet state the milk freed of its oleaginous properties but retaining its nutritious properties, thereby rendering it easy of digestion and putting it in a condition adapted to give the best results when employed in connection with cream of tartar and bicarbonate of soda as a baking-powder, or for the other uses specified. The milk, when brought into the condition stated and incorporated with the cream of tartar and bicarbonate of soda, produces a powder or composition capable of long preservation and in such form as to be always ready for immediate use and giving the most satisfactory results to be attained by the use of the constituent elements or properties of milk deprived of its oleaginous constituents and yet free from the acid existing in the milk in a state of fermentation.

To the accomplishment of the foregoing and such other objects as may hereinafter appear, the invention consists in the composition of matter hereinafter particularly described, and then sought to be specifically defined by the claims.

In carrying out my invention I take the milk remaining after the cream has been manipulated in the method ordinarily practiced in creameries for extracting butter therefrom and put the milk thus freed of its oleaginous properties and in a sweet condition in suitable evaporating-pans and subject it to a boiling heat for a period of four hours (more or less) to destroy germs that may be contained therein, and then I remove the product and place it on porcelain slabs and subject it in a hot-air chest to a temperature of about 120° Fahrenheit for a period of four hours, (more or less,) until it is reduced to a thoroughly dry state, and then I remove it and pass it through suitable rolls to reduce it to fine powder or particles, and then in its thoroughly dry and comminuted state it is mixed or incorporated with cream of tartar and bicarbonate of soda in about the proportion of four pounds of the dry or desiccated milk powder, eighteen pounds of bicarbonate of soda, and thirty-six pounds of cream of tartar, to which I preferably add twelve pounds of corn-starch. The composition of matter is then packed in suitable receptacles for the market, and is ready for use in any household as a baking-powder or for other uses for which it may be adapted. While it is much preferred to use the corn-starch in the composition, as it has been found by the use of that ingredient with the others that the most satisfactory results are obtained when the composition is used as a baking-powder, still I do not wish to be understood as limiting myself to that ingredient used with the others, as the same may be omitted without departing from the scope of my invention. I have discovered, however, after numerous experiments that the best results are obtained by the use of all the ingredients named in the proportions or substantially the proportions specified. If too large a proportion of the dry and powdered milk is employed in the composition, the dough out of which the bread or pastry is to be made will be found to be too stiff or tough to make the finest grade of bread or pastry; but when the ingredients are in about the proportions specified the dough will be found to be in the best condition to make the finest and richest biscuit and bread and the lightest and sweetest cakes without the use of more milk than what is contained in the composition.

The composition dispenses with the necessity of using alum, tartaric, citric, or other acids commonly used in baking-powders, and is found to give superior results over baking-powders in which such mentioned ingredients may be used.

Having described my invention and set forth its merits, what I claim is—

1. The composition of matter consisting of bicarbonate of soda, cream of tartar, and milk in a dry comminuted state deprived of its oleaginous properties and free from acid developed by fermentation, substantially as and for the purposes described.

2. The composition of matter consisting of bicarbonate of soda, cream of tartar, corn starch, and milk in a dry comminuted state deprived of its oleaginous properties and free from acid developed by fermentation, in the proportions substantially as specified, and for the purposes described.

In testimony whereof I affix my signature in presence of two witnesses.

JOHN DALLAS GREGORY.

Witnesses:
   ALFRED T. GAGE,
   NATHAN H. ROBBINS.